Patented May 7, 1940

2,199,920

UNITED STATES PATENT OFFICE 2,199,920

ADMIXTURE FOR CONCRETE OR CEMENT

Andrew Marzoli, Union City, N. J.

No Drawing. Application September 9, 1937,
Serial No. 163,093

3 Claims. (Cl. 106—27)

This invention relates to an admixture or compound for incorporation in concrete during the mixing thereof to effect a more perfect crystallization of the cement and bonding thereof with the sand and aggregate and which facilitates the setting of the concrete and renders the same more durable while producing a glazed outer finish so that the surface thereof is more impervious and resistant to the elements and will not check or rub off.

The invention further provides a compound adapted for incorporation in a matrix of cement and aggregate of sand, gravel and broken stone for withstanding heavy loads and for surfacing or finishing concrete consisting of a cement matrix and sand and fine gravel and when incorporated in a surfacing or finishing concrete, the same facilitates the adhesion and bonding of the concrete to brick, stone or other type of masonry or cement work.

As a still further object the invention provides a compound which may also be employed in a cement mix for patching cracks in concrete and masonry structures and in repairing broken concrete and masonry walls or structures.

With the above and other objects in view, the invention is set forth in greater detail in the following description and particularly pointed out in the appended claims.

The compound consists approximately of fifty pounds of finely powdered lime, such as finishing lime; one to two quarts of benzine or turpentine or a mixture of benzine and turpentine; two quarts of a vegetable oil, such as linseed oil; eight pounds of wax, such as paraffin wax or beeswax, or a mixture thereof; sixteen ounces of a soap mixture, which mixture consists of one pound soap to ten gallons of water; two gallons of a glue mixture consisting of two pounds of fish or animal glue dissolved in three gallons of water with sufficient calcium chloride added thereto so as to obtain a specific gravity of the compound of ten to eleven degrees Baumé.

The compound is produced in the following manner. The lime is heated in a receptacle until the temperature of the lime is sufficient to liquefy the wax when added thereto and when liquefied the wax is thoroughly mixed with and incorporated in the lime. The benzine and/or turpentine, together with the linseed oil is then mixed with the lime and wax while still maintained in a heated condition. The soap mixture ingredient is then added together with two gallons of glue mixture and fifteen gallons of water and the resultant mixture is thoroughly stirred and intermixed for approximately one-half hour while being maintained in a heated condition during the mixing thereof, the resultant admixture or compound being of a pasty consistency when cool.

In the production of the compound or admixture, the benzine or turpentine or mixture thereof serves as a solvent for liquefying and maintaining the wax in a liquid condition while the vegetable oil or linseed oil serves as a plasticizer for preventing too rapid setting or hardening of the concrete. The soap mixture facilitates the working of the concrete and tends to obtain a smoother finish while the glue mixture acts as a binder for preventing voids and crevices.

The compound is preferably incorporated in a cement mix with the following proportions when the same is to be used for a surfacing or finishing concrete: Six parts of cement; twelve parts of sand or sand and grit; two parts of compound together with water sufficient to obtain proper consistency. For concrete in which heavy aggregate is used, the approximate proportions of the compound in the cement mix is as follows: Six parts of cement; twelve parts of said or sand and grit; eighteen parts broken stone, slag or cinders; two parts of compound and water sufficient to obtain proper consistency.

What is claimed is:

1. An admixture for concrete including lime, a vegetable oil plasticizer, wax, a wax solvent, an adhesive mixture including glue and water with calcium chloride added to obtain a specific gravity of the admixture of approximately ten degrees Baumé, and water.

2. An admixture for concrete including fifty pounds of powdered lime, two quarts of linseed oil for preventing too rapid setting of the concrete, eight pounds of paraffin wax, one quart benzine for liquifying and maintaining the wax in a liquid condition, one pound of soap for facilitating the working of the concrete and for obtaining a smooth finish, two gallons of an adhesive including two pounds of fish glue dissolved in three gallons of water with calcium chloride added thereto to obtain a specific gravity of the admixture of approximately 10° Baumé.

3. An admixture for concrete including lime, linseed oil, paraffin wax, benzine, and an adhesive mixture including fish glue and calcium chloride.

ANDREW MARZOLI.